United States Patent
Lutz et al.

(10) Patent No.: US 8,408,189 B2
(45) Date of Patent: Apr. 2, 2013

(54) PETROL ENGINE HAVING A LOW-PRESSURE EGR CIRCUIT

(75) Inventors: Philippe Lutz, Le Vesinet (FR); Sebastien Potteau, Triel sur Seine (FR); Laurent Albert, Vallangoujard (FR)

(73) Assignee: Valeo Systemes de Controle Moteur, Cergy Pontoise (FR)

( * ) Notice: Subject to any disclaimer, the term of this patent is extended or adjusted under 35 U.S.C. 154(b) by 226 days.

(21) Appl. No.: 12/682,182

(22) PCT Filed: Oct. 9, 2008

(86) PCT No.: PCT/FR2008/001411
§ 371 (c)(1), (2), (4) Date: Jun. 30, 2010

(87) PCT Pub. No.: WO2009/083665
PCT Pub. Date: Jul. 9, 2009

(65) Prior Publication Data
US 2010/0275892 A1  Nov. 4, 2010

(30) Foreign Application Priority Data
Oct. 10, 2007  (FR) ...................................... 07 07095

(51) Int. Cl.
*F02B 47/08* (2006.01)
(52) U.S. Cl. .................................. 123/568.12; 701/108
(58) Field of Classification Search ............. 123/568.12, 123/568.15, 568.21, 559.1, 563, 316; 701/108; 60/605.1, 605.2, 598, 599, 602
See application file for complete search history.

(56) References Cited

U.S. PATENT DOCUMENTS

| | | | |
|---|---|---|---|
| 6,948,475 B1* | 9/2005 | Wong et al. | 123/299 |
| 2004/0221831 A1* | 11/2004 | Chmela et al. | 123/301 |
| 2005/0241302 A1* | 11/2005 | Weber et al. | 60/311 |
| 2006/0243241 A1 | 11/2006 | Kuo et al. | |
| 2007/0227141 A1* | 10/2007 | Ma et al. | 60/599 |
| 2009/0132153 A1* | 5/2009 | Shutty et al. | 701/108 |
| 2009/0165758 A1* | 7/2009 | Nishiumi et al. | 123/568.21 |
| 2010/0000500 A1* | 1/2010 | Shimizu et al. | 123/568.21 |

FOREIGN PATENT DOCUMENTS

| | | |
|---|---|---|
| DE | 19523106 C1 | 6/1996 |
| EP | 1 637 715 A2 | 3/2006 |
| FR | 2 892 154 A1 | 4/2007 |
| JP | 2006257940 A | 9/2006 |
| WO | 2007/012778 A2 | 2/2007 |

OTHER PUBLICATIONS

International Search Report w/translation from PCT/FR2008/001411 dated Jun. 16, 2009 (6 pages).

* cited by examiner

*Primary Examiner* — Mahmoud Gimie
(74) *Attorney, Agent, or Firm* — Osha Liang LLP

(57) ABSTRACT

Internal combustion petrol engine comprising an engine block (2) connected to an intake circuit (3) including a compressor (6) and an exhaust circuit (4) including a turbine (13) which drives the compressor, the internal combustion engine including an exhaust gas recirculation circuit (11) which is connected to the exhaust circuit downstream of the turbine and is connected to the intake circuit upstream of the compressor, the recirculation circuit comprising a cooler. Method of managing such an engine.

11 Claims, 1 Drawing Sheet

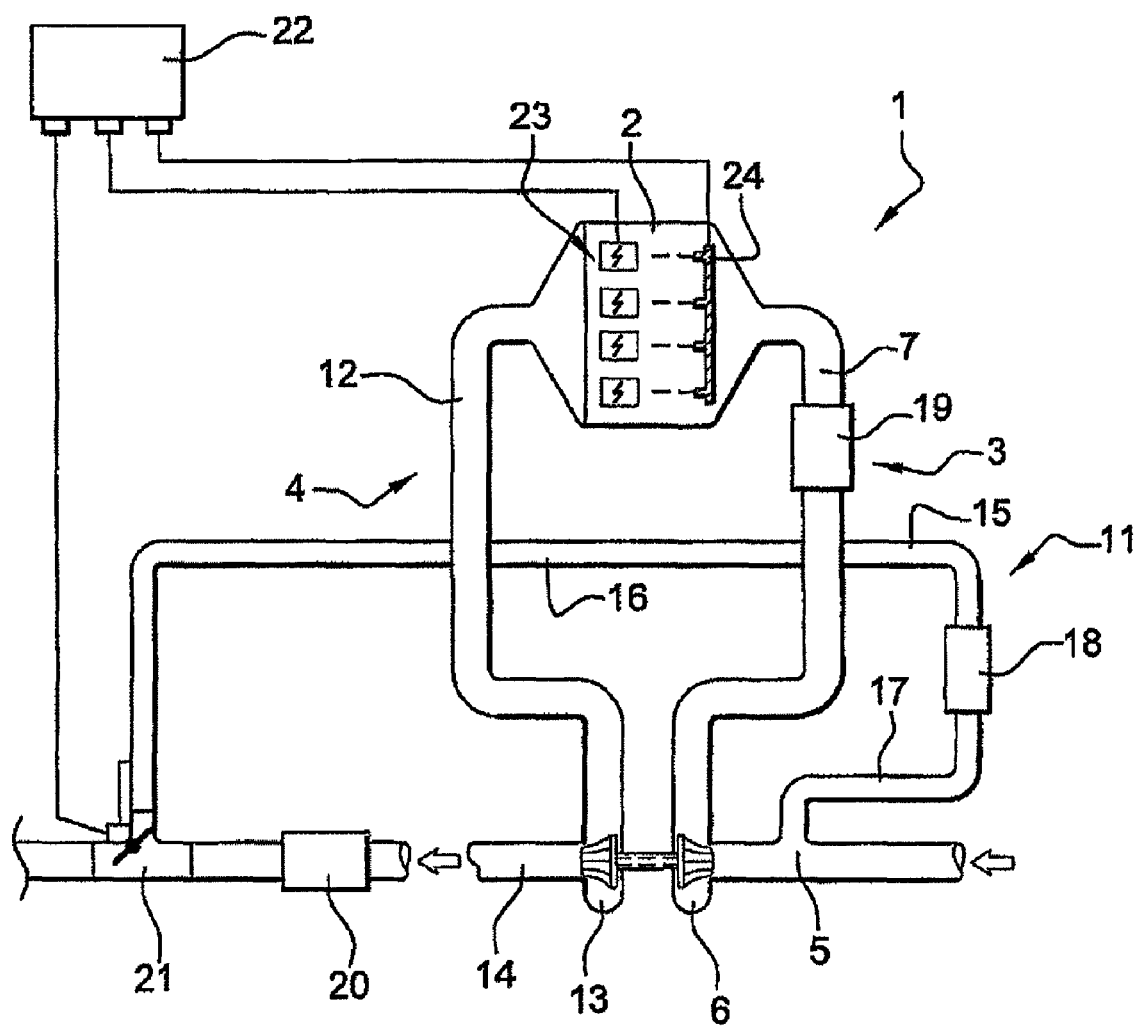

PETROL ENGINE HAVING A LOW-PRESSURE EGR CIRCUIT

The present invention relates to a heat engine that can be used notably for moving a motor vehicle and a method for managing such an engine. The invention more particularly relates to turbocharged engines using gasoline as fuel.

BACKGROUND OF THE INVENTION

Such an engine usually comprises an engine block which delimits combustion chambers connected to an intake circuit comprising a compressor and an exhaust system comprising a turbine for driving the compressor. The engine block is associated with a device for introducing gasoline into the combustion chambers, usually injectors, and with an ignition device in order to initiate, in each combustion chamber, the combustion of the mixture formed by the air from the intake circuit and by the gasoline from the injectors. When the engine is on full load, for example in the acceleration phase, it happens that the combustion of the air-gasoline mixture is not perfect, the compression of the mixture generating, in the combustion chamber, shock waves (explosive combustion or knocking) that could damage the engine.

To solve this problem, it is known practice to enrich the mixture by increasing the quantity of gasoline mixed with the intake air and to retard the ignition. This has the drawbacks of increasing the consumption of gasoline and, departing from the stoichiometric proportions allowing complete combustion of the air-gasoline mixture, of reducing the efficiency of the catalytic converter of the exhaust system which operates optimally when the stoichiometric proportions are maintained. The result of this is increased pollution.

OBJECT OF THE INVENTION

An object of the invention is to propose a means for limiting the occurrence of knocking in gasoline engines.

SUMMARY OF THE INVENTION

For this purpose, according to the invention, a gasoline heat engine is proposed comprising an engine block delimiting a combustion chamber, which combustion chamber is connected to an intake circuit comprising a compressor and an exhaust system comprising a turbine for driving the compressor, the engine comprising a cooler connected to the intake circuit and an exhaust gas recirculation circuit which is connected to the exhaust system downstream of the turbine and is connected to the intake circuit upstream of the compressor.

The exhaust gas recirculation circuit makes it possible to introduce, into the supply system, cooled exhaust gases which it has been found made it possible to delay the occurrence of knocking. Specifically, the cooled exhaust gases thus reintroduced play no role in the combustion but take on a function as a heat trap notably making it possible to limit the occurrence of areas of spontaneous combustion in the mixture contained in the combustion chamber. Therefore, introducing exhaust gas into the combustion chamber makes it possible to increase knocking resistance and therefore to increase the ignition advance. The result of this is an increase in engine torque for one and the same richness in fuel relative to a conventional gasoline engine, or to reduce the mixture to stoichiometric proportions and reduce fuel consumption for performances that are identical to those of conventional gasoline engines. Moreover, this also makes it possible to reduce the temperature of the exhaust gases and to limit the impact of the latter on the components of the exhaust system such as the turbine and the catalytic converter. At low load, the introduction into the combustion chamber of exhaust gas therefore makes it possible to reduce the nitrogen oxide emissions (the production of the catalytic converter then requires a smaller quantity of precious metals) and to reduce pumping losses at the intake (thereby reducing fuel consumption). Tapping off the gases downstream of the turbine appears particularly effective in obtaining the desired effects.

According to a particular embodiment, the cooler is placed between the compressor and the engine block and preferably the cooler is a water cooler.

A water cooler (also called an air-water heater) is particularly effective and makes it possible, with a relatively small footprint, to sufficiently cool the recirculated air-gas mixture which comes out of the compressor at a high temperature of the order of 180° C. This limited footprint of the water cooler also makes it possible to bring the point of injection of the recirculated gases closer to the engine block. This makes it possible to improve the response of the engine to variations of speed.

A further subject of the invention is a method for managing such an engine comprising the step, when the motor has an operating parameter reaching a limit threshold at which knocking occurs, of acting on a quantity of gas from the recirculation circuit introduced into the supply system. This makes it possible to make the air pressure less sensitive to knocking.

Preferably, the method comprises the step of acting in combination also on a quantity of gasoline introduced into the combustion chamber and an ignition advance.

The ignition advance makes it possible to have better combustion producing greater torque partly compensating for the torque reduction caused by the introduction of the cooled exhaust gases. The ignition advance can also be maintained at its former level or even reduced and the richness of the mixture modified in consequence as a function of the quantity of exhaust gas reintroduced.

Other features and advantages of the invention will emerge on reading the following description of a particular, nonlimiting embodiment of the invention.

BRIEF DESCRIPTION OF THE DRAWINGS

Reference will be made to the appended single FIGURE representing schematically a heat engine according to the invention.

DETAILED DESCRIPTION OF THE INVENTION

With reference to the figure, the heat engine according to the invention, generally designated as 1, comprises an engine block 2 defining, in a manner known per se, combustion chambers provided with pistons rotating an output shaft of the engine. The combustion chambers of the engine block 2 are connected in a manner known per se to a supply system generally designated as 3 and to an exhaust system generally designated as 4.

The supply circuit 3 comprises an intake duct 5 leading into a compressor 6 connected to a supercharging air cooler itself connected via an intake manifold 7 to the combustion chambers of the engine block 2. The compressor 6 is in this instance a centrifugal compressor known per se comprising a bladed rotor 8 mounted so as to pivot about a shaft 9 in a housing 10. The intake duct 5 leads into the housing 10 coaxially with the rotation shaft 9.

The exhaust system 4 is known per se and comprises an exhaust manifold 12 connecting the combustion chambers of the engine block 2 to a turbine 13 for rotating the compressor 6. The turbine 13 is connected to an exhaust outlet duct 14 incorporating a catalytic converter 20.

The heat engine also comprises a circuit 11 for recirculating the exhaust gases. The circuit 11 for recirculating the exhaust gases has a duct 15 having one end 16 connected via a valve 21 to the exhaust manifold 12 downstream of the catalytic converter 20 and therefore of the turbine 13 and one end portion 17 connected to the intake duct 5 upstream of the compressor 6. Between these two ends, the duct 16 incorporates a heat exchanger 18.

The supercharging air cooler 19 is in this instance a water exchanger the water of which is regulated to a temperature of the order of 50 to 55° C. in order to obtain a mixture admitted into the cylinder at a temperature of less than 60° C. approximately. The exhaust gases reinjected into the intake circuit do not in themselves allow the combustion but are used as a heat trap to reduce the temperature of the mixture in the combustion chamber.

The valve 21 is a three-way valve (one inlet way connected to the outlet of the catalytic converter, a first outlet way connected to the inlet of the recirculation circuit 11 and a second outlet way connected to the outlet of the exhaust system 4) which comprises a butterfly that can move between a first extreme position in which the butterfly directs the fluid mainly toward the recirculation circuit and a second extreme position in which the butterfly directs the flow mainly toward the outlet of the exhaust system 4. In its first extreme position, the butterfly has a portion extending facing the second outlet way in order to create in the latter a pressure drop which helps the exhaust gases to travel into the recirculation circuit 11. It is therefore not necessary to have, downstream of the valve 21, a dedicated flap for causing this pressure drop.

The engine comprises an engine control unit (ECU) 22 connected to an ignition device generally designated as 23 (in this instance spark plugs placed in each combustion chamber), to a fuel delivery device generally designated as (in this instance an injection array with injectors placed in each combustion chamber and connected to a fuel system), and to the valve 21.

The control unit 22 controls in a manner known per se the fuel delivery device 24 in order to determine the proportion of fuel injected into the combustion chamber relative to the quantity of air admitted (richness of the mixture). The control unit 22 controls in a manner known per se the ignition device 23 in order to advance or retard the ignition relative to the top dead center of the cycle of the piston of each combustion chamber. The control unit 22 also controls the valve 21 in order to regulate the flow rate of exhaust gas entering the recirculation circuit 11. The control of these various components is carried out as a function of parameters detected in the engine, such as the speed of the latter, the temperature, the acceleration demand, etc.

It is known practice to use the value of certain of these parameters to determine the risk that knocking will occur. Notably it is known that the risk of knocking is greater at full load. It is also possible to use a knocking detector.

According to the invention, when at least one of these parameters reaches a limit threshold at which knocking occurs (notably when the engine speed and/or an acceleration demand are higher than predetermined thresholds), the engine management method used by the control unit 22 comprises the step of acting in combination on:

the quantity of gas from the recirculation circuit 11 introduced into the supply system 3 (control of the valve 21), a quantity of gasoline introduced into the combustion chamber (control of the delivery device 24), and an ignition advance (control of the ignition device 23), so as to retard and even prevent the occurrence of knocking.

When the threshold at which knocking occurs is reached, the control unit 22 can therefore command the admission of a larger quantity of exhaust gas and the step of maintaining the ignition advance at a value at least equal to its current value or increasing the ignition advance (as a function of the desired performance) while maintaining the richness of the mixtures in the stoichiometric proportions.

At low load, the control unit 22 is also programmed to inject exhaust gases into the supply system 3. Introducing exhaust gas into the combustion chamber then makes it possible to reduce the nitrogen oxide emissions (the production of the catalytic converter then requires a smaller quantity of precious metals) and to reduce the pumping losses at the intake (thus reducing fuel consumption).

Naturally, the invention is not limited to the embodiment described and variant embodiments can be brought to it without departing from the context of the invention as defined by the claims.

In particular, the engine may have a structure that differs from that described. The three-way valve can therefore be replaced by an EGR valve placed close to the compressor in order to regulate the flow rate of the exhaust gases introduced into the supply system and a butterfly placed in the exhaust line downstream of the junction to the recirculation circuit in order to generate downstream of the recirculation circuit a back-pressure promoting the movement of the exhaust gases into the recirculation circuit.

According to a less effective variant, the cooler 18 can be omitted and the supercharging air cooler 19 can be dimensioned to ensure sufficient cooling.

According to another less effective variant, it is possible to act only on the quantity of exhaust gas reintroduced into the intake circuit in order to make the pressure of oxidizer less sensitive to knocking.

The invention claimed is:

1. A method for managing a gasoline heat engine for a motor, comprising:

acting on a first quantity of gas from a recirculation circuit introduced into the supply system, when the motor has an operating parameter reaching a limit threshold at which knocking occurs, wherein the operating parameter is one selected from the group consisting of a quantity of gas from the recirculation circuit introduced into the intake, a quantity of gasoline introduced into a combustion chamber, and an ignition advance, detected at the engine block; and controlling the operating parameter so that a richness of the mixture introduced into the combustion chamber is maintained in a stoichiometric proportion when the operating parameter reaches the limit threshold;

wherein the engine comprises:

an engine block operatively connected to an intake circuit comprising a compressor;

an exhaust system comprising a turbine for driving the compressor;

a cooler connected to the intake circuit; and the recirculation circuit operatively connected to both the exhaust system downstream of the turbine and to the intake circuit upstream of the compressor, wherein the cooler is a water cooler, and wherein the water cooler is placed between the compressor and the engine block for cooling a recirculated air-gas mixture output from the compressor.

2. The method as claimed in claim 1, further comprising:
acting in combination also on a second quantity of gasoline introduced into a combustion chamber and an ignition advance.

3. The method as claimed in claim 2, wherein, when the operating parameter reaches the limit threshold at which knocking occurs, the first and second quantities of gas introduced into the supply system and the ignition advance, respectively, are increased.

4. The engine as claimed in claim 1, wherein the recirculation circuit introduces cooled exhaust gases into the supply system.

5. The engine as claimed in claim 4, wherein the cooled exhaust gases function as a heat trap, allowing for limited occurrence of knocking in the gasoline heat engine.

6. The engine as claimed in claim 1, wherein the cooler is a water cooled placed between the compressor and the engine block for cooling a recirculated air-gas mixture output from the compressor, and wherein the water cooler comprises a small footprint, allowing for a point of injection of the recirculated gases to be closer to the engine block.

7. The engine as claimed in claim 1, wherein the recirculation circuit introduces cooled exhaust gases into the supply system.

8. The engine as claimed in claim 7, wherein the cooled exhaust gases function as a heat trap, allowing for limited occurrence of knocking in the gasoline heat engine.

9. A gasoline heat engine comprising:
an engine block of the gasoline heat engine operatively connected to an intake circuit comprising a compressor;
an exhaust system comprising a turbine for driving the compressor;
a cooler connected to the intake circuit; and
an exhaust gas recirculation circuit operatively connected to both the exhaust system downstream of the turbine and to the intake circuit upstream of the compressor,
wherein, when at least one parameter selected from the group consisting of a quantity of gas from the recirculation circuit introduced into the intake, a quantity of gasoline introduced into a combustion chamber, and an ignition advance, detected at the engine block reaches a limit threshold at which knocking occurs, the at least one parameter is controlled so that a richness of the mixture introduced into the combustion chamber is maintained in a stoichiometric proportion.

10. The engine as claimed in claim 9, wherein the exhaust gas recirculation circuit is connected to the exhaust system by means of a valve comprising a control member connected to an engine control unit in order to regulate a flow rate of gas in the recirculation circuit.

11. The engine as claimed in claim 9, wherein the exhaust system comprises a catalytic converter downstream of the turbine and wherein the recirculation circuit is connected to the exhaust system downstream of the catalytic converter.

\* \* \* \* \*